(12) United States Patent
Lankers et al.

(10) Patent No.: US 11,209,346 B2
(45) Date of Patent: Dec. 28, 2021

(54) LIQUID CELL FOR THE MICROSCOPIC IMAGING AND RAMAN SPECTROSCOPIC MATERIAL ANALYSIS OF PARTICLES SUSPENSIONS

(71) Applicant: Unchained Labs, Pleasanton, CA (US)

(72) Inventors: Markus Lankers, Schoneiche (DE); Oliver Valet, Berlin (DE); Lisa Krapf, Berlin (DE); Karsten Goede, Berlin (DE); Steve Bober, Altlandsberg (DE)

(*) Notice: Subject to any disclaimer, the term of this patent is extended or adjusted under 35 U.S.C. 154(b) by 0 days.

(21) Appl. No.: 16/603,817

(22) PCT Filed: Apr. 11, 2018

(86) PCT No.: PCT/EP2018/059344
§ 371 (c)(1),
(2) Date: Oct. 8, 2019

(87) PCT Pub. No.: WO2018/189274
PCT Pub. Date: Oct. 18, 2018

(65) Prior Publication Data
US 2020/0116624 A1 Apr. 16, 2020

(30) Foreign Application Priority Data
Apr. 11, 2017 (DE) .......................... 102017107857.6

(51) Int. Cl.
*G01J 3/44* (2006.01)
*G01N 15/14* (2006.01)
(Continued)

(52) U.S. Cl.
CPC ............ *G01N 15/1436* (2013.01); *G01J 3/44* (2013.01); *G01N 21/05* (2013.01); *G01N 21/65* (2013.01);
(Continued)

(58) Field of Classification Search
CPC ................. G01N 21/65; G01N 21/658; G01N 2021/656; G01J 3/44; G01J 3/02
(Continued)

(56) References Cited

U.S. PATENT DOCUMENTS

| 3,552,865 A | 1/1971 | Leung et al. |
| 4,714,345 A | 12/1987 | Schrader |

(Continued)

FOREIGN PATENT DOCUMENTS

| DE | 102013015033 A1 | 3/2015 | |
| DE | 102017107857 A1 * | 10/2017 | ......... G01N 15/1468 |

(Continued)

OTHER PUBLICATIONS

International Search Report dated Jul. 18, 2018, for PCT Application No. PCT/EP2018/059344, filed on Apr. 11, 2018, 2 pages.
(Continued)

*Primary Examiner* — Md M Rahman
(74) *Attorney, Agent, or Firm* — Cooley LLP

(57) ABSTRACT

The invention relates to a liquid cell (1) for the microscopic image capture and Raman spectroscopic material analysis of a particle suspension in a reflected light microscope, having at least the following components: a measuring chamber (2) which has a base (3), a measuring window (5) opposite the base (3), and a seal (6), wherein the base (3) has a planar design at least in one region of the support of the seal (6), and the base (3) has a reflective surface (4) which is provided such that Raman excitation light incident through the measuring window (5) is reflected on the reflective surface (4) in a directed manner such that the background signal in a Raman measurement is reduced and the Raman signal of a particle in a suspension is increased. The invention further relates to a microscope which has such a liquid cell.

19 Claims, 5 Drawing Sheets

(51) Int. Cl.
  *G01N 21/05* (2006.01)
  *G01N 21/85* (2006.01)
  *G02B 21/10* (2006.01)
  *G02B 21/34* (2006.01)
  *G01N 21/65* (2006.01)
  *G01N 15/00* (2006.01)

(52) U.S. Cl.
  CPC ............. *G01N 21/85* (2013.01); *G02B 21/10* (2013.01); *G02B 21/34* (2013.01); *G01N 2015/0053* (2013.01)

(58) Field of Classification Search
  USPC .......................................................... 356/301
  See application file for complete search history.

(56) References Cited

U.S. PATENT DOCUMENTS

| | | |
|---|---|---|
| 5,471,294 A | 11/1995 | Ogino |
| 5,753,449 A | 5/1998 | Yamaguchi et al. |
| 6,636,304 B2 | 10/2003 | Gilby |
| 7,605,919 B2 | 10/2009 | Oma et al. |
| 8,085,396 B2 | 12/2011 | Matousek et al. |
| 9,354,178 B2 | 5/2016 | Lee |
| 2002/0064800 A1 | 5/2002 | Sando et al. |
| 2010/0053605 A1 | 3/2010 | Ragucci et al. |
| 2012/0034686 A1 | 2/2012 | Berlin et al. |
| 2013/0039611 A1* | 2/2013 | Russ .................... F16C 19/381 384/486 |
| 2019/0315118 A1* | 10/2019 | Landa ...................... C08K 3/04 |

FOREIGN PATENT DOCUMENTS

| | | |
|---|---|---|
| EP | 1 329 706 A1 | 7/2003 |
| GB | 1 124 126 A | 8/1968 |

OTHER PUBLICATIONS

Written Opinion of the International Searching Authority dated Jul. 18, 2018, for PCT Application No. PCT/EP2018/059344, filed on Apr. 11, 2018, 6 pages.

* cited by examiner

LIQUID CELL FOR THE MICROSCOPIC IMAGING AND RAMAN SPECTROSCOPIC MATERIAL ANALYSIS OF PARTICLES SUSPENSIONS

CROSS-REFERENCE TO RELATED APPLICATIONS

This application is a U.S. National Phase application, filed under 35 U.S.C. § 371, of International Application No. PCT/EP2018/059344, filed on Apr. 11, 2018, which claims priority to German Application No. DE 102017107857.6, filed on Apr. 11, 2017, each of which is hereby incorporated by reference in its entirety.

The invention relates to a liquid cell according to claim 1, to a system according to claim 8, and to a microscope according to claim 9.

Many pharmaceuticals are analysed for foreign particles and/or protein aggregates as standard. Often this is even prescribed by regulatory requirements such as those of the US FDA. Such regulations concern for example the maximum numbers of particles, broken down into different size classes. In order to ensure that limit values are not exceeded, particles must be identified and quantified. This includes detecting and distinguishing aggregates in protein solutions, foreign particles and air bubbles. This takes place by means of a device which is designed to make it possible to detect particles and also to determine the size and shape thereof. Particles can be detected in various ways. However, imaging techniques such as light microscopy are common.

Imaging of particles in liquid cells and flow cells is already known from the prior art (U.S. Pat. No. 5,471,294, EP 1329706, U.S. Pat. No. 7,605,919). Using FlowCam, for example, it is possible to capture and analyse images of particles as the latter flow through the cell (U.S. Pat. No. 7,605,919). The particles can be assigned to different classes (for example protein aggregates, air bubbles or silicone droplets) on the basis of shape parameters of the particles and evaluation algorithms. However, it is not possible to determine precisely the substance from which the particle is made. In such methods, it would be advantageous if the imaging of particles in a liquid could be carried out with determination of the particle material by Raman spectroscopy in the same measurement cell. This would make it possible for example to identify and differentiate different proteins or polymers.

For a combined measurement which involves imaging and targeted Raman spectroscopic measurement, i.e. based on the captured images, a microscope configured in this way would need to have comprehensive optical and mechanical devices. This is due, inter alia, to the fact that Raman spectroscopic measurements are usually point measurements and it must be ensured that the Raman spectroscopic measurement is carried out at the correct location. Only in this way can the two measurement methods be combined to give a correlated overall measurement result.

Methods are known in which the start-up of particles in so-called "wet cells" for Raman spectroscopy is carried out in an automated manner. The automatic detection of the size and shape and also of the location of microparticles in a suspension with the aim of carrying out vibrational spectroscopy has already been described by Malvern (Malvern Application Note "Characterization of protein aggregates in suspension and on a filter membrane by Morphologically-Directed Raman Spectroscopy"). Said document publishes results which show that, by a combined, automated detection of particles and Raman spectroscopy in the "thin-path wet cell", different particle species in a protein solution can be distinguished. The imaging of the sample takes place in transmitted light, for which reason a transparent measurement window made of quartz is used both for the upper side and for the lower side of the measurement cell.

Another liquid cell that can also be used for Raman spectroscopy on particles is described in DE 102013015033. In this flow cell, the imaging takes place in reflected light geometry.

One problem with both of the aforementioned measurement cells is the substantial background of the substrate. The glass or quartz glass that is usually used likewise generates a Raman signal during the measurement, which can superimpose the signal from the sample that is to be measured such that the quality of the latter becomes much poorer and thus it becomes more difficult to identify the particle substance. This is particularly relevant when measuring microparticles, since in this case the spot illuminated by the excitation light may be much larger than the particle to be analysed and thus the proportion of the background signal may be very large.

Besides the substantial background of the measurements, the following problems must also be solved in the case of such measurements.

Air bubbles, which may form when filling the measurement chamber, must be avoided since these can lead to measurement artefacts. The formation of air bubbles is particularly problematic in the case of highly viscous suspensions.

To ensure the widest possible use of the liquid cell, the cell must be manufactured from inert materials and in particular must be easy to clean, so that contamination of subsequent samples can be ruled out.

Furthermore, the layer thickness of the suspension to be analysed is critical since, if the layer is too thick, optimal focusing on the particles is not possible. Conversely, if the liquid layer is very thin, there is a risk that a very substantial background signal will be generated by the window material located close to the focal point. This background signal superimposes the Raman signal and makes it more difficult for the particle material to be determined by spectroscopy.

In addition, the sample volume to be analysed should be of variable size, so that on the one hand samples containing a low number of particles can be analysed (requires a rather large volume), but on the other hand samples which are available only in small amounts can be analysed (small sample volume).

The image contrast, that is to say the contrast between particles and background, is often not sufficiently high in the known methods. This leads to errors both in the measurement and in the evaluation of the measurement data.

Another difficulty when determining the particle material by means of Raman spectroscopy is that of achieving a sufficiently high signal quality. For example, it is often necessary to analyse protein aggregates in a highly concentrated protein solution, the Raman signal of said aggregates differing only slightly from that of the surrounding liquid.

The aim of the invention is therefore to provide a liquid cell by which the variety of problems mentioned above are advantageously solved; in particular, the intention is to improve the signal-to-noise ratio for measurements in a liquid cell according to the invention with regard to image-guided, Raman spectroscopic measurements. The aim of the invention is also to provide a microscope by which the aforementioned tasks can advantageously be achieved.

The problem according to the invention is solved by a liquid cell according to claim 1. Advantageous embodiments of the invention are specified in the dependent claims and will be described below.

A liquid cell for the microscopic image capture and image-guided Raman spectroscopic material analysis of a particle suspension in a reflected light microscope accordingly has at least the following components:
- a measurement chamber which has a base, a measurement window located opposite the base and in particular extending parallel to the base, and a seal, wherein
- the base is planar at least in a region of the bearing area of the seal, wherein the base has a reflective surface which in particular is smooth, in particular is smooth in some regions, and which is provided such that light, in particular Raman excitation light, incident through the measurement window is directionally reflected at the reflective surface so that the background signal in the case of a Raman measurement is reduced and the Raman signal of a particle contained in a suspension is increased.

The reflective surface in this case has a reflectance of in particular more than 70% in at least a broad range of the electromagnetic spectrum, in particular in the ultraviolet, visible and near-infrared spectral range. The surface is such that incident light rays are directionally reflected, namely largely independently of the angle of incidence, i.e. the reflection is in particular not limited only to limit angles for total reflection. The reflective surface advantageously leads to an improvement in the signal-to-noise ratio in the case of Raman spectroscopic measurements, in particular due to the fact that, on account of the reflection, the excitation laser excites the particle(s) twice, namely on the way from an objective to the sample and on the way after reflection at the reflective surface. In addition, a background signal of the base is suppressed, as a result of which better detection of the sample signal is possible. In order to achieve a sufficiently directional reflection of sufficient quality and also in order to be able to be used with advantage for dark-field illumination, the base should have a sufficiently smooth and flat surface. The so-called RZ number of the surface can be used to characterize the smoothness or roughness. The RZ number characterizes the roughness of a surface, in particular the average roughness. A person skilled in the art knows how to determine the RZ number. The RZ number should in particular be less than 0.1, preferably less than 0.01. The increase in the Raman signal is therefore in particular not the result of a sample surface effect, as used for example in "surface-enhanced Raman spectroscopy (SERS)".

In particular, the base extends along a plane.

The invention advantageously enables the use of microscopes or of objectives with comparatively small working distances, in particular down to 1 mm, and thus correspondingly large numerical apertures, which is particularly advantageous with regard to an improved signal-to-noise ratio in the case of Raman measurements.

Solutions with a curved, for example spherical or cylindrical, base geometry or measurement chamber geometry are inferior to the solution according to the invention, since a curved measurement chamber geometry is not suitable for using objectives with short working distances but instead requires larger working distances, in particular more than 5 mm, and accordingly lower numerical apertures in order to compensate for the increased distance of the top of the measurement chamber from the base.

For the same lens diameter, therefore, the numerical aperture of such a curved measurement chamber geometry is thus in particular more than tripled in comparison to the liquid cell according to the invention having a flat base and a particularly flat measurement window, leading to a collection efficiency for the Raman signal that is more than 9 times lower.

In addition, curved measurement chamber geometries carry the risk of optical refocusing, in particular of the excitation light, which may lead to false signals.

According to the invention, the base of the liquid cell is flat or even planar in the region of bearing of the seal, that is to say in particular it has no recess. In the region of bearing of the seal, the base thus formed is in particular flat and is shaped so as to establish a form-fit with the regions of the base on which the sample is applied or which are encompassed by the measurement chamber. With a base configured in this way, it is also possible to use very low seals. In particular, it has been found here that for example seals made of Teflon (i.e. polytetrafluoroethylene, PTFE), in particular in the form of Teflon film or other thin materials which have a sealing effect, such as for example polyethylene, polyvinyl chloride or polycarbonate, can advantageously be used. The thickness of such films (and thus the height of the resulting seal) is in particular in the region of a few micrometres, for example between 50 μm and 500 μm.

The advantage of an in particular recess-free liquid cell is in particular the easier cleaning of the liquid cell and of the base, since, as is known, any recess forms accumulation areas for contamination, for example at the edges.

The flat seals may also have a much larger bearing area than the thick seals, since they do not have to be able to be inserted into a recess. Such an enlarged bearing area increases the mechanical stability of the seal, particularly in the case of small seal thicknesses, and improves the handling.

These flat seals for the recess-free or planar liquid cells advantageously also make it possible to move away from a shallow-cylindrical configuration of the measurement volume and to use for example shallow cuboidal volumes. When the liquid cell is used as a flow cell, said shallow cuboidal volumes permit a more favorable flow profile than constructions in which the flow cross-section becomes wider for example in the middle between the inlet and the outlet, as would be the case with a shallow-cylindrical volume.

It is therefore provided according to another embodiment of the invention that the liquid cell have a cuboidal measurement chamber.

The liquid cell according to the invention can advantageously be used in microscopes which have an epi geometry or reflected light geometry with respect to the beam path, in which both the illumination and the measurement signal of the sample take place via the same lens or the same objective (epi configuration). This geometry often proves to be advantageous since, for example, an inlet opening and also an outlet opening can be arranged in the base; the base of the liquid cell is therefore available for tasks such as tempering or flow generation, for example, without interfering with the optics of the microscope.

The liquid cell according to the invention can advantageously be used in combined measurement apparatuses which carry out both image capture and image-guided Raman spectroscopy in reflected light geometry. Such a liquid cell according to the invention can be easily assembled from the components and can be produced particularly inexpensively. Each component of the liquid cell is in particular replaceable in a modular fashion.

According to one embodiment, the base has an inlet opening and an outlet opening, for filling, emptying, evacuating and/or generating a throughflow in the measurement chamber, wherein the inlet opening and/or outlet opening is/are arranged in particular in a region of the base that is part of the measurement chamber. These openings may comprise further connections or may have such connections.

The inlet opening and outlet opening are designed in particular to pump through and/or push through a large amount of liquid relatively quickly. The openings are designed for liquid quantities of in particular 20 µl to 100 µl per minute.

It is advantageous if the inlet and/or outlet opening are configured such that cannula tips can be connected or fitted to the openings or placed thereon in a liquid-tight manner. In particular, the openings have a diameter of one millimetre.

According to one embodiment of the invention, the reflective surface of the base comprises a metal or a metal alloy, wherein in particular the base is made of the metal or the metal alloy, and the surface and the base are therefore formed in one piece.

A base made of stainless steel, which is polished to a mirror finish on the reflective side, is suitable by way of example. Such a base is advantageously inert to most solutions, can easily be cleaned, and has particular durability.

A layer which, for example, prevents any accumulation of suspension constituents or protects the reflective surface against the effects of the solvent or suspension may optionally be applied to the reflective base.

According to an alternative embodiment of the invention, the reflective surface is a reflective layer, such as for example gold, silver and/or nickel, which is arranged on the base, for example applied thereto by plating, vapour deposition or adhesive bonding.

The base may in particular comprise glass, quartz glass or a glass-like substrate or may be made of glass, quartz glass or the glass-like substrate, which serves as a substrate for the reflective layer.

According to one embodiment of the invention, the reflective surface is semi-transparent and in particular is arranged on a transparent substrate. The substrate in particular forms the base.

The substrate comprises in particular glass, quartz glass or glass-like substances or is made of glass, quartz glass or glass-like substances. The advantage of glass, quartz glass and glass-like substances is that these materials have the property of being able to form surfaces which are flat on a molecular level, that is to say very flat, without any need for complicated finishing steps.

The semi-transparency of the reflective surface refers to the fact that, for a given wavelength of light, the surface reflects a fraction of the incident light and is transparent to another fraction of the light, that is to say the reflectance is in particular less than 95% and the transmittance is in particular greater than 5%.

According to one embodiment of the invention, particularly when the base comprises a glass substrate or the like, the base is arranged or mounted on a lower part, wherein the lower part in particular has an opening or a cutout, in particular in the middle, so that the base is optically and/or mechanically accessible through the opening or cutout, in particular for a microscope objective.

According to one embodiment of the invention, the semi-transparent surface is a semi-transparent layer arranged on the transparent substrate.

Such a layer may for example comprise a metal or a metal alloy, wherein the layer has in particular a thickness of 10 nm to 200 nm, in particular a thickness between 50 nm and 150 nm.

The semi-transparent layer is in particular a gold, silver or nickel layer, which in particular is applied to, vapor-deposited on or adhesively bonded to a substrate made of glass or quartz glass.

Such a semi-transparent layer makes it possible to carry out both in particular transmitted light-based microscopy methods and Raman spectroscopy on the same sample, without having to use another liquid cell.

In particular, the material of the semi-transparent layer may be selected such that the layer is semi-transparent in a first wavelength range and is predominantly or completely reflective in a second wavelength range of the light, in particular has a reflectance of more than 60%.

In particular, it is advantageous if the semi-transparent layer is predominantly reflective in the range of the Raman spectroscopic excitation, in particular in the second wavelength range, in particular has a reflectance of more than 60%, and has a transmittance of at least 30% in the wavelength range of a transmitted light microscopy method that is used, in particular in the first wavelength range.

The liquid cell according to the invention thus enables Raman spectroscopic measurements in epi configuration and also transmitted light microscopy, which opens up advantageous contrast mechanisms for optically delimiting the particle from the background.

In the layer-based embodiments, it is also provided for example that a plurality of layers are applied to the base, for example a gold layer is vapor-deposited onto a nickel layer. By way of example, a functional molecule layer may be arranged as the uppermost layer of such a plurality of layers.

In addition, the plurality of layers can also be used to realize optical filter layers, such as Bragg reflectors for example.

This also includes a layer which, as already explained above, for example prevents any accumulation of suspension constituents or protects the reflective layer optionally against the harmful effects of the suspension.

According to one embodiment of the invention, the reflective surface is continuously reflective in the visible spectral range, in particular in the wavelength range from 300 nm to 800 nm, in particular in the range from 210 nm to 1200 nm, in particular with a reflectance of more than 70%.

This variant of the invention advantageously ensures that a liquid cell according to the invention can be used in many applications, regardless of the excitation and detection wavelengths.

In addition, a dark-field illumination can advantageously be carried out with such a reflective surface.

According to another embodiment of the invention, the liquid cell has a pressing element which is configured such that the liquid cell in the assembled state of the invention can be introduced into a sliding guide, wherein the pressing element, when the liquid cell is introduced into the sliding guide, is held down by the sliding guide such that the pressing element presses on the measurement window, the seal and the base so that the measurement chamber is sealed, wherein the pressing element is arranged with a first region on or above the measurement window and in particular is arranged with a second region on or above the base.

Such a liquid cell will be liquid-tight and/or gas-tight in the pushed-in state.

The sliding guide therefore in particular cooperates with the pressing element and the base such that the liquid cell is held together.

The pressing element advantageously enables the liquid cell to be assembled in a quick and uncomplicated manner. A functional liquid cell can be obtained simply by joining the components together in a sandwich-like manner and then pushing them into a sliding guide.

The pressing element can in particular be implemented as a retaining ring so that, in the assembled state of the liquid cell, a measurement under a microscope is also possible since the excitation and detection can take place in a central region of the measurement window; the ring-shaped design of the pressing element as a retaining ring therefore does not interfere with the optics of a reflected light microscope.

According to another embodiment of the invention, the liquid cell has a spacer element, wherein the spacer element is arranged on the base of the liquid cell, in particular outside of the measurement chamber on the base of the liquid cell, wherein the pressing element bears with the second region on the spacer element such that the measurement window can be pressed onto the base by the pressing element only to a predefined spacing, wherein the height of the spacer element defines said spacing of the measurement window from the base.

In particular the height and the volume of the measurement chamber, in particular the spacing of the measurement window from the base of the measurement chamber, can be set by way of the spacer element, in particular by way of the height of the spacer element.

The modular principle of the liquid cell is advantageously implemented by virtue of the spacer element, which for example may be a washer or a shim. The spacer element is in particular not permanently connected to the base. As a result, spacer elements of different height can be used in order to obtain measurement chambers of different height.

According to another embodiment of the invention, the liquid cell has an insert element, wherein the insert element is arranged in the recess between the base and the seal, so that the seal is arranged in a manner shifted upward in the recess by the height of the insert element, in particular such that the measurement window, when the measurement window is at a spacing from the base predefined by the spacer element, already bears against the seal in such a way that the measurement chamber is leaktight, wherein the insert element is in particular dimensioned such that the height of the insert element corresponds to the height of the spacer element or differs therefrom by a fixed amount in the height of the spacer element.

The insert element ensures in particular that a leaktightness is achieved also for spacer elements of different height.

The insert element may be, for example, an insert disc. The insert element is in particular not permanently connected to the base and contributes to the modular nature of the invention.

In particular, a system can be conceived which comprises, besides the liquid cell, also a plurality of different insert elements and spacer elements, which will be used as required. A variety of liquid cells can thus be realized, which vary in the height and volume of the measurement chamber.

In particular, by using different spacer elements and insert elements, it is ensured that on the one hand the liquid layer thickness in the measurement chamber can be set individually for the respective sample, and on the other hand the volume of the measurement chamber can also be made sufficiently large or small.

The insert element and the spacer element are adapted to one another, namely in particular in such a way as to prevent breakage caused by pressure at the outer edges of the measurement window while nevertheless ensuring a leaktight pressure seal of the measurement chamber. The height that the two elements must be is known to a person skilled in the art and may depend inter alia on the depth of the recess, the height of the seal and the thickness of the measurement window.

According to another embodiment of the invention, the measurement window has a transmittance of greater than 80% for light at least in the spectral range from 210 nm to 1200 nm, preferably in the spectral range from 532 nm to 785 nm, wherein the measurement window comprises in particular quartz glass.

With such a measurement window, it is possible to excite and to detect for example the tryptophan fluorescence.

The problem according to the invention is additionally also solved by a system which has the following features:
- a holding device for closing a liquid cell and fixing it in place,
- a liquid cell according to the invention,
wherein the holding device has a sliding guide, into which the liquid cell can be pushed, and wherein the sliding guide has a pressing plate which is configured to press the measurement window onto the seal when the liquid cell is accommodated in the holding device.

The problem according to the invention is also solved by a microscope having the following features.

Such a microscope has means for the microscopic image capture and Raman spectroscopic measurements of a particle suspension, wherein the microscope is an optical reflected light microscope, and wherein the microscope has a liquid cell according to the invention and in particular a holding device or in particular a system according to the invention.

With the microscope according to the invention, the aforementioned analyses on particle suspensions can be carried out in reflected light geometry, wherein advantageously the signal-to-noise ratio is improved, in particular in comparison to liquid cells having a non-reflective substrate, by using the liquid cell according to the invention.

A microscope in the context of the invention is a light microscope which has optics suitable for use in particular from 200 nm to 1200 nm.

A means for microscopic image capture comprises for example an objective, a detector such as for example a camera, and/or a light source such as for example a laser, a halogen lamp or other types of light sources, such as diodes or arc lamps.

A means for Raman spectroscopic measurements comprises for example an excitation laser, a point detector, and suitable filters for the Raman measurement.

In one embodiment of the invention, the microscope has means which enable a dark-field illumination of the sample in the liquid cell, wherein the reflective base of the liquid cell serves as a reflector for the irradiated dark-field illumination.

Such a means for dark-field illumination comprises for example a special dark-field objective, with which such a dark-field illumination can be carried out in reflected light geometry.

Dark-field illumination has the advantage that a higher image contrast can be achieved for certain samples and particle suspensions. In particular, samples having a refractive index which differs only slightly from the solvent can advantageously be detected and measured using dark-field illumination and the liquid cell according to the invention.

The combination of dark-field illumination with the reflective surface of the base of the liquid cell is particularly advantageous since the reflective surface of the base reflects the dark-field illumination, so that as little scattered light as possible is scattered back from the base into the objective, which leads to an increased image contrast and thus to better identification of particles in a suspension.

In dark-field illumination, the surface quality is very important since even slight unevennesses give rise to a signal that is not unequivocally different from the one generated by a particle located on the surface.

In order to capture structures/particles clearly, the surface roughness should not be of the same order of magnitude as the particle itself. Since, according to the invention, particles in the sub-micrometre range or in the micrometre range are to be spectroscopically measured, the surface roughness is accordingly lower, that is to say in particular in the nanometre or sub-nanometre range.

Further features and advantages of the invention will be explained below by describing the figures which show exemplary embodiments. The description of the figures serves only to illustrate a few exemplary embodiments and is not to be understood as a complete disclosure of all possible embodiments of the invention. However, individual features which are disclosed only in connection with the exemplary embodiments can also be used beyond the exemplary disclosure as features in the claims, provided that they do not conflict with other features of the claim. In the figures:

Figure 1:
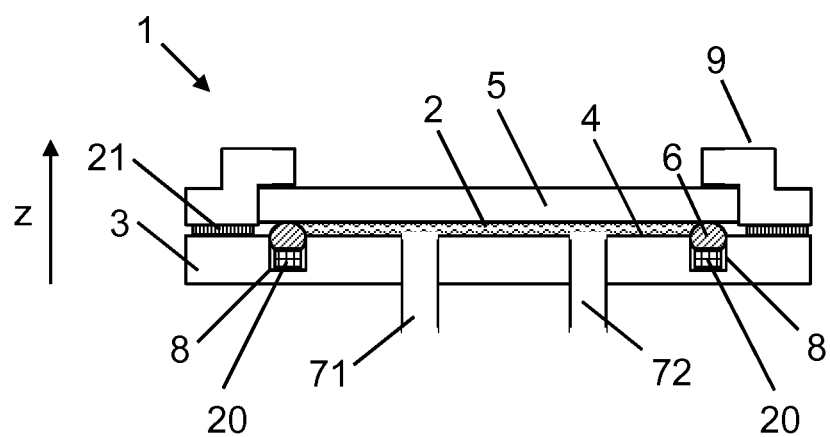
FIG. 1 shows a schematic illustration of a section through a liquid cell according to the invention.
Figure 2:
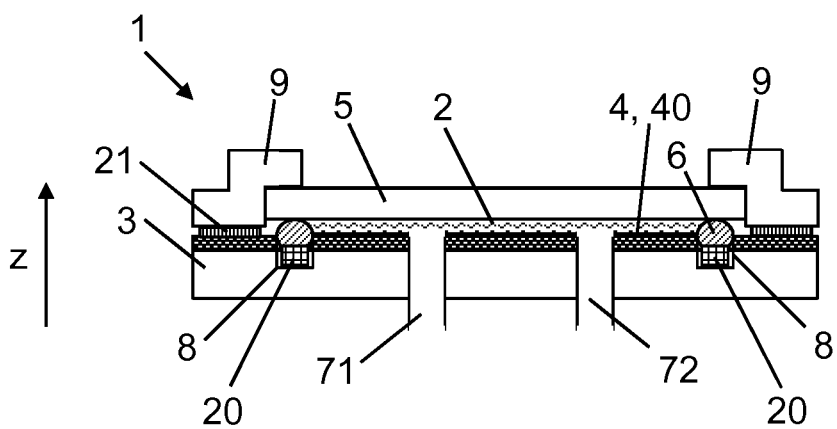
FIG. 2 shows a schematic illustration of a section through a variant of the liquid cell according to the invention.

FIG. 1 and FIG. 2 show a section along the z-axis z (direction of the height and Raman excitation) through a liquid cell 1 according to the invention. The liquid cell 1 has a base 3 with a reflective surface 4, 40, wherein the base 3 comprises a recess 8, into which a seal 6, here in the form of an O-ring, is inserted. An insert element 20, here in the form of an insert disc, is arranged between the seal 6 and the recess 8. The recess 8 is configured in this example in the form of a groove. A measurement window 5 is arranged on the seal 6. The space enclosed by the seal 6, the measurement window 5 and the base 3 forms a measurement chamber 2.

A spacer element 21 in the form of a washer is arranged outside of the measurement chamber 2, wherein the height of the spacer element 21 (i.e. along the z-axis) is such that on the one hand the sealing effect is ensured by the pressing of the measurement window 5 against the seal 6 and on the other hand it is also ensured that the pressure that can be imparted to the measurement window 5 by a pressing element 9 in combination with a sliding guide 201 does not lead to breakage of the measurement window 5. In other words, the lowest position of the pressing element 9 in relation to the z-axis is defined by the spacer element 21. The base 3 of the measurement chamber 2 additionally has an inlet opening 71 and an outlet opening 72. Through these openings 71, 72, a sample liquid can be replaced or the measurement chamber 2 can be cleaned, without disassembling the liquid cell 1.

The liquid cell 1 consists of only a few components and is of modular construction (see FIG. 6), that is to say it can easily be cleaned. In addition, due to the modular construction, the individual components can easily be replaced and adapted to specific applications. The liquid cell 1 is configured such that the layer thickness of the sample solution or suspension to be analysed is optimal for the detection and image-guided Raman analysis of particles in protein formulation. Furthermore, in the examples mentioned, the liquid cell is circular along the x-z plane. However, other basic shapes are readily conceivable and are not intended to be ruled out here.

The base 3 of the liquid cell 1 is manufactured from stainless steel. It is thus rustproof, durable and does not interact with the sample (inert). The base 3 made of stainless steel is particularly easy to clean.

In FIG. 1, the stainless steel surface 4 of the base 3 is smoothed and/or polished. A reflective surface 4 is thus provided which is highly planar and smooth to a nanometre level. The roughness can be characterized here using the so-called RZ number. An RZ number of less than 0.1, preferably less than 0.01, is advantageous.

FIG. 2 shows a variant of the liquid cell 1. Here, the base 3 has, on the side facing towards the measurement chamber 2, a reflective layer 40 as the reflective surface 4, which is made of a different material than the base 3. This may be for example a thin layer of gold, silver or nickel, which has been vapour-deposited onto a slide. A different reflective material can thus be used depending on the excitation wavelength and the sample to be measured. Moreover, an inexpensive, single-use variant of the base 3 can thus be provided. Here, too, the RZ number is less than 0.1.

Figure 5:
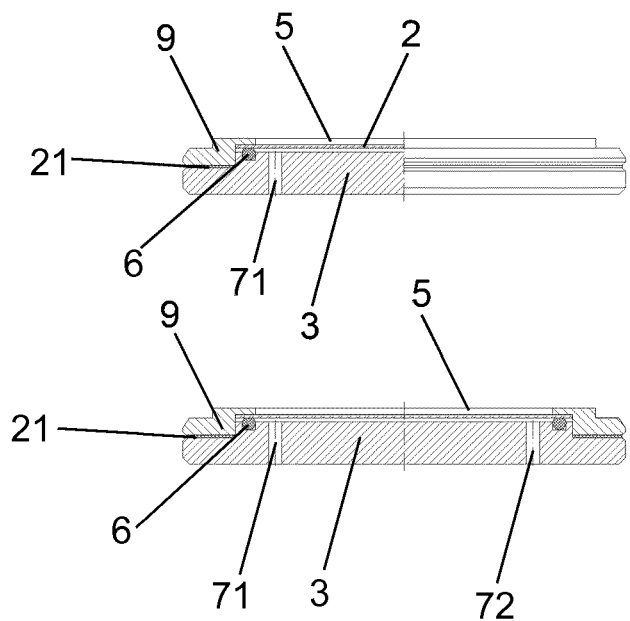
FIG. 5 shows an embodiment of the liquid cell without an insert element.

Another variant of the liquid cell is shown in FIG. 5, in one instance as a pure sectional view and also as a half-section. The reference signs and arrangement of the components are substantially identical to the variants in FIG. 1 and FIG. 2. However, in a manner differing from FIG. 1 and FIG. 2, the liquid cell in FIG. 5 has no insert element 20. In this variant, the spacer element 21, the thickness of the seal 6 and the groove depth (recess 8) are specifically selected such that the insert element 20 can be omitted.

Figure 7:
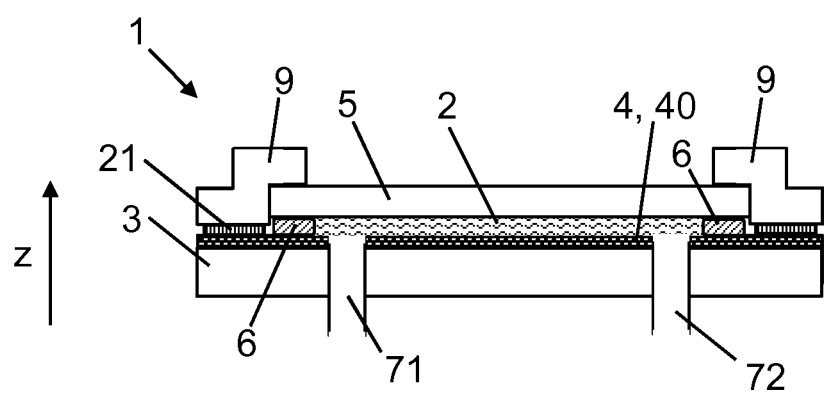
FIG. 7 shows a schematic illustration of a section through a variant of the liquid cell according to the invention.

FIG. 7 shows a section along the z-axis z (direction of the height and Raman excitation) through a liquid cell 1 according to the invention. The liquid cell 1 has a base 3 with a reflective surface 40, wherein the base 3 is manufactured from a transparent substrate, namely glass, and the reflective surface is semi-transparent, that is to say comprises a metal layer of just 50 nm. In a manner differing from the examples of FIG. 1 and FIG. 2, the base has no recess into which the seal 6 is placed, but instead is planar in the region of the bearing area for the seal 6. The seal 6 is manufactured from a Teflon film and has a height of just 100 µm, so that no recess is required. With this liquid cell, on account of the transparent base 3 and the semi-transparent metal layer, it is possible to carry out both Raman spectroscopy in epi configuration and also transmitted light microscopy, without the advantages of the reflective liquid cell for Raman spectroscopy being notably impaired.

Figure 8:
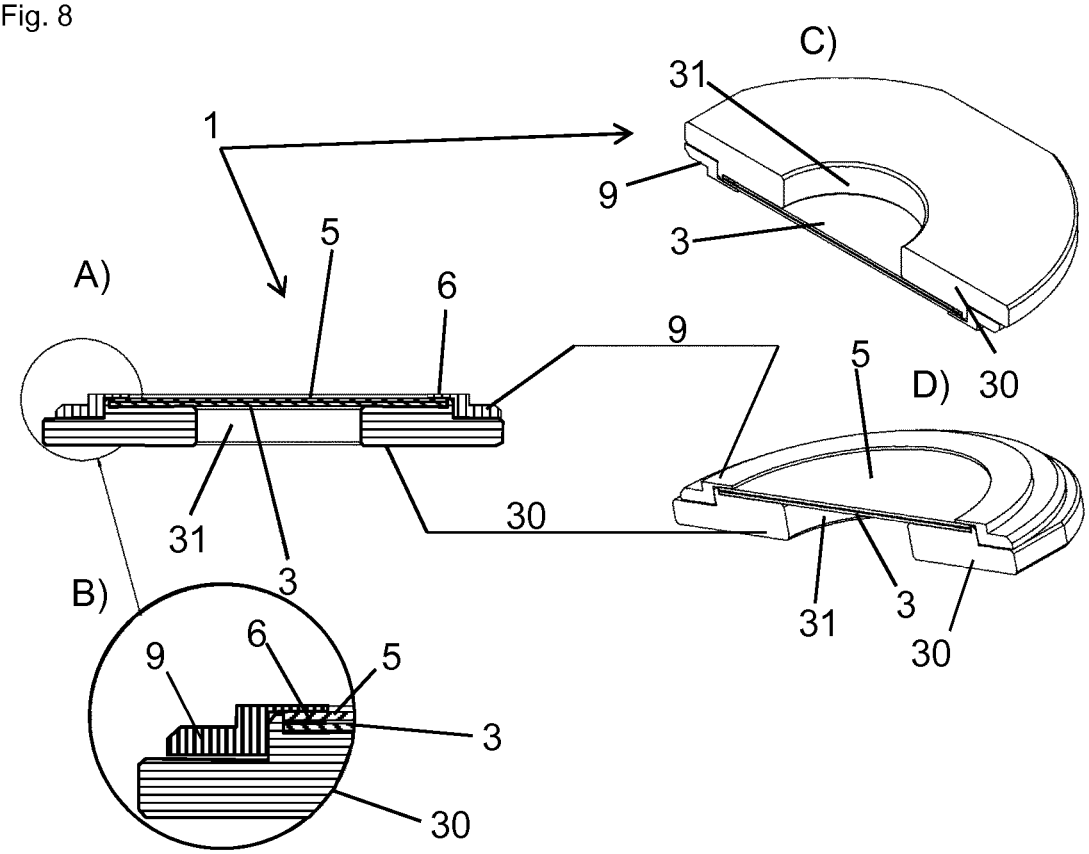
FIG. 8 shows various views of a liquid cell according to the invention which is suitable for transmitted light microscopy.

FIG. 8 shows another embodiment of the invention in various views. Specifically, A) shows a sectional view through the liquid cell 1, B) shows an enlarged detail view of the sectional view A), C) shows a perspective sectional view of the liquid cell 1 from below, and D) shows a perspective sectional view of the liquid cell 1 obliquely from above.

This embodiment has a base 3 which comprises a gold layer on a glass substrate, said gold layer having a thickness of 50 nm and thus being semi-transparent. The base is arranged on a lower part 30, wherein the lower part is manufactured from a metal and has a cutout 31 in the middle so that the base is optically and mechanically accessible also from below, in particular for a microscope objective. This embodiment is therefore particularly suitable for microscope analysis of the liquid cell 1 also in transmitted light.

As in the other embodiments shown, the measurement window 5 is connected to the lower part and to the base by a pressing element 9, in particular when the liquid cell is introduced into a holder provided for this purpose, which presses the pressing element and the base against one another.

Arranged at the edge between the measurement window 5 and the base is a thin Teflon film, which serves as a seal 6 for the liquid cell 1.

An inlet opening and an outlet opening (not shown) may also be arranged on the liquid cell, which openings may be formed for example as openings in the base.

The following remarks apply to all exemplary embodiments of the liquid cell 1, in so far as implementation thereof is possible in the embodiment in question.

Due to the mirror effect of the reflective surface 4, 40, the excitation light, for example the light from the excitation laser, is conducted through the sample twice and thus leads to a Raman signal that is ideally twice as high. In addition, the reflective surface, unlike many other materials such as glass, does not cause any background signal (FIGS. 1 and 2).

The imaging takes place through a measurement window 5 which is transparent at least in the visible range of the spectrum, wherein the transparent range may extend into the near-infrared range (up to around 1000 nm) and the ultraviolet range (up to around 210 nm). A set of different measurement windows 5 may be used in the liquid cell 1 so that a measurement window 5 of optimal thickness and transmission can be provided for each measurement.

The measurement window 5 used may be, for example, a transparent disc made of quartz glass, gorilla glass, lotus glass or willow glass having a diameter of around 50 mm. The thickness of the measurement window 5 is approximately 500 µm and is thus on the one hand stable enough to withstand deformations and breakage due to pressure, but on the other hand thin enough to minimize optical aberrations and thus impairment of the imaging and spectroscopy.

To excite tryptophan autofluorescence at 266 nm, use is preferably made of a measurement window 5 made of quartz, which is transparent both in the UV and in the visible spectral range.

The layer thickness of the suspension can be set between 50 µm and 500 µm by way of the spacing of the base 3 from the measurement window 5. In this range, on the one hand a good focusing onto the sample particles is possible, and on the other hand the background signal caused by Raman excitation of the window material is low.

All of the materials that form the measurement chamber 2 are highly inert.

The external diameter of the annular groove (which in this example corresponds to the recess 8) is 45 mm, thereby defining the imageable surface area of the measurement chamber 2. The groove depth is 1.7 mm. First an insert disc is inserted in the groove as an insert element 20, and then the seal 6 is placed thereon. The layer thickness of the liquid to be analysed is between 50 µm (without an insert disc or with a very low height of the insert disc) and 500 µm (insert disc has a height of 500 µm) and is defined by the height of the spacer element 21, wherein the height of the insert element 20, that is to say in this case of the insert disc, is adapted accordingly so that the measurement chamber is leaktight. The sample volume to be analysed is therefore also defined by the height of the spacer element 21 and is thus between 80 µl and 800 µl. The O-ring 6 comprises PTFE or Viton, which is resistant to solvents and does not interact with the liquid to be analysed. The O-ring has a cord thickness (height) of 2 mm. The groove depth and the thickness of the O-ring remain substantially the same. The height of the insert element 20 is adapted to that of the spacer element 21.

Assembly of the Liquid Cell

Figure 6:
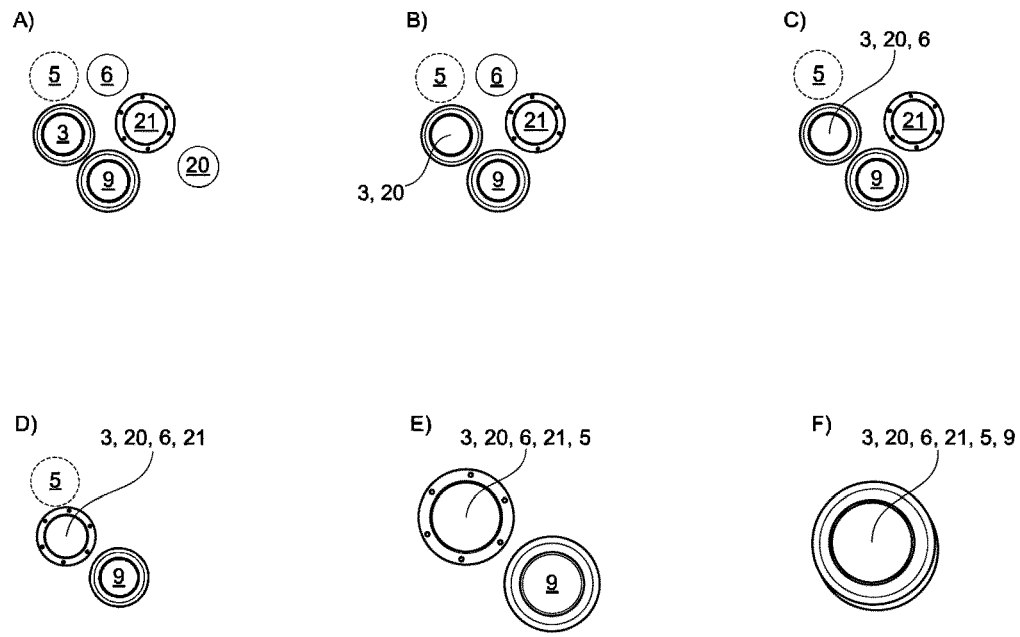
FIG. 6 shows a sequence of images illustrating the assembly of a liquid cell according to the invention.

FIG. 6 shows the assembly of a liquid cell according to the invention as a sequence of images. The assembly steps are carried out alphabetically from A) to F) in order to arrive at the assembled liquid cell.

A) All the individual parts of the modular liquid cell are not yet joined together but instead exist separately. In this example, said parts are the base 3, the measurement window 5 (shown here by a dashed outline), an insert disc as the insert element 20, a washer as the spacer element 21, a seal 6, and a pressing element 9. In this example, the base has no inlet and outlet opening. Alternatively, however, a base 3 having said openings 71, 72 is also conceivable.
B) The insert disc 20 is placed into the recess 8 of the base 3.
C) The seal 6 is then placed onto the insert disc in the recess 8 of the base 3.
D) The spacer element 21 is then placed onto the base 3.
E) The measurement window 5 is then placed onto the seal 6.
F) The pressing element 9 is then placed onto the measurement window 5 and the spacer element 21.

In this assembled state, the liquid cell 1 can be pushed into a holding device 200 with a sliding guide 201. The holding device 200 is arranged on a microscope stage 203. The holding device 200 also comprises, in the region of the sliding guide 201, a pressing plate 202 which is designed to apply pressure to the sides of a liquid cell 1 that has been pushed into the sliding guide 201. These two components form the system according to the invention.

Figure 3:
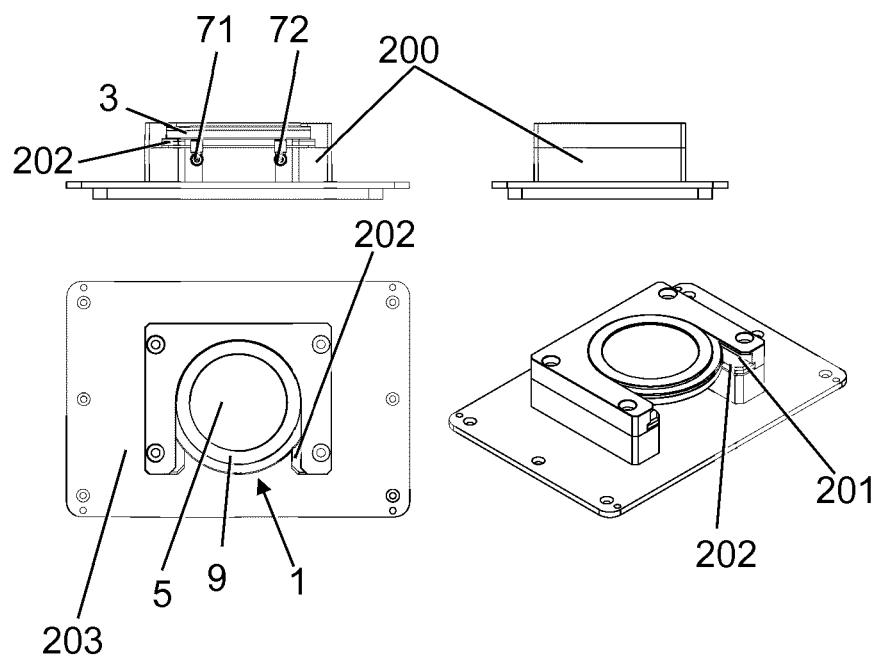
FIG. 3 shows various representations of a holding device with a liquid cell.

FIG. 3 shows the system consisting of the holding device 200 with the inserted liquid cell 1. The sliding guide 201 engages partially around the pressing element 9. The base 3 is pressed upwards (direction of z-axis) in the sliding guide 201 by the pressing plate 202 and is pressed against the upper guide so that the pressing element 9 seals the liquid cell 1 and the liquid cell 1 remains firmly assembled.

In FIG. ∞3, the base 3 has an inlet opening 71 and an outlet opening 72.

Handling/Filling of the Liquid Cell

The liquid cell 1 can be filled with sample liquid when the liquid cell 1 is open (with the measurement window 5 open or without any measurement window) or when the liquid cell 1 is closed (with the measurement window 5 closed and bearing against it). When the liquid cell 1 is closed, the sample liquid can be filled into it or withdrawn from it via the inlet opening 71 and the outlet opening 72, respectively.

The inlet opening 71 and the outlet opening 72 are arranged in the base 3 of the liquid cell 1 so that the measurement chamber 2 can be filled and vented. Via the outlet opening 72, a negative pressure can be generated in the measurement chamber 2, which enables bubble-free filling of the measurement chamber 2. This prevents the automatic particle detection from being falsified by air or gas bubbles in the suspension. The measurement chamber 2 is filled for example using a pipette/pipette tip or by connecting tubes via a Luer system.

The imaging then takes place in reflected light geometry of the microscope. The entire surface area of the measurement chamber 2 can be imaged. The particle detection takes place for example automatically by way of an algorithm.

Microscope

A suitable microscope for image capture and particle detection has a 10× objective (typical NA 0.25) or 20× objective (typical NA 0.45). The corresponding depths of field are approximately 20 µm and approximately 5 µm, respectively. The image capture preferably takes place with dark-field illumination, which is possible due to the smooth, reflective surface 4 of the base 3. A higher contrast is thus achieved between the particles and the background, which improves the automatic computer-aided particle detection.

In particular, if the liquid cell 1 is configured with a variable layer thickness, the conditions can be optimized in each case for particles of different size. For small particles, a small layer thickness is set and the 20× objective is used; for larger particles, a large layer thickness is set and the 10× objective is used.

Regardless of the objective used, the image capture can take place via tryptophan autofluorescence if a UV-transmissive measurement window 5 is used.

The particles are analysed by automated, image-guided Raman spectroscopy. To this end, a laser of wavelength 532 nm is used, which is highly scattered by proteins. The irradiation of the laser light and also the detection of the Raman signal can take place by means of a 50× or 100× objective.

Figure 4:
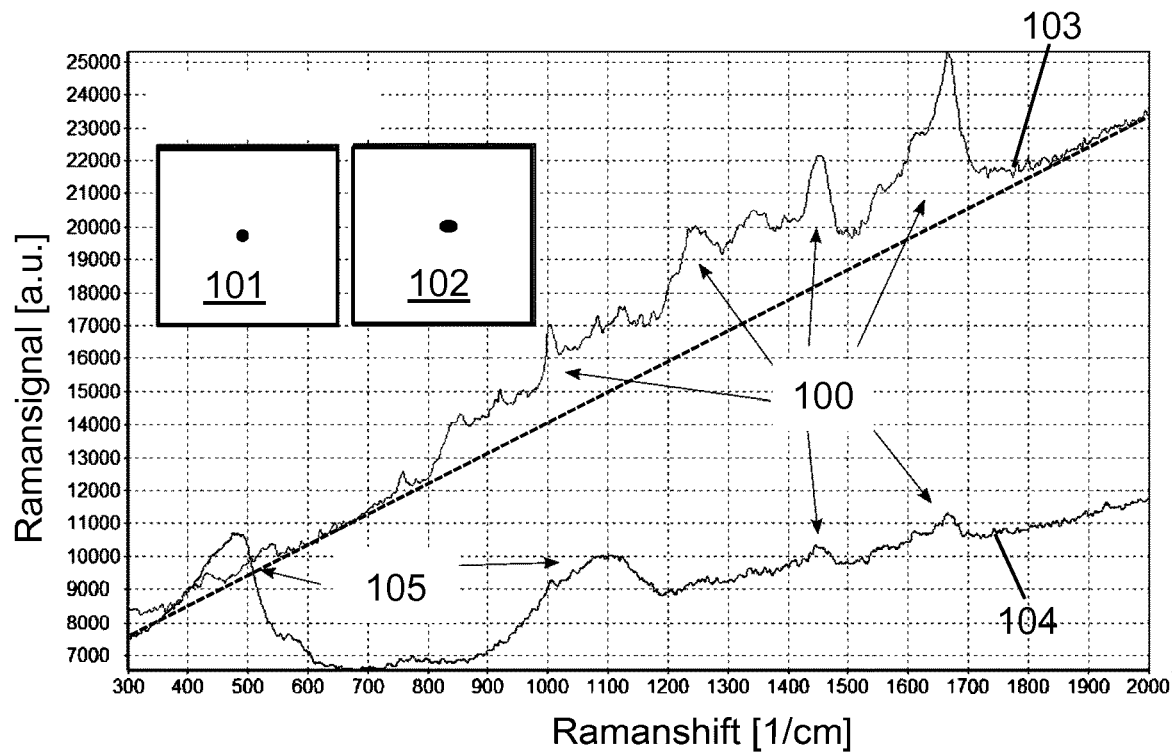
FIG. 4 shows a diagram illustrating the effect of a reflective surface on a Raman signal.

FIG. 4 shows the effect of a reflective nickel surface 101 compared to a substrate made of gorilla glass 102 on a measured Raman signal 103, 104.

The top left corner of the diagram shows a microscopic image of the nickel surface 101 and also an image of a gorilla glass surface. The images are approximately the same in terms of contrast, so that no differences can be detected during image capture. The images captured in bright field in the liquid cell show the positions of a comparable particle in each case, on which the respective Raman spectra were recorded.

A Raman measurement 103, 104 of the proteins nevertheless shows clear differences. The Raman signal 104 measured on the gorilla glass substrate exhibits much lower protein signal levels 100 than the comparable measurement of the same suspension on a reflective nickel surface 103. Although the background (dashed line) also increases in the case of the nickel surface, this can nevertheless easily be subtracted from the signal 103 in order to arrive at a corrected signal. The signal levels 100 of the proteins on the nickel surface 103 are much higher than in the case of the measurement on gorilla glass 104.

In addition, no Raman signals from the substrate itself can be detected on the nickel surface 101, 103. On the gorilla glass substrate 102, 104, however, signals 105 which do not come from the sample can be seen.

The liquid cell according to the invention disclosed here, the system consisting of the liquid cell and the holding device 200, and the microscope according to the invention thus considerably help to improve image-guided, Raman spectroscopic analysis of protein suspensions in reflected light microscopes.

The invention claimed is:

1. A liquid cell for the microscopic image capture and Raman spectroscopic material analysis of a particle suspension in a microscope comprising:
a measurement chamber, the measurement chamber comprising a base, a measurement window located opposite the base, and a seal; and
a pressing element configured to couple with a sliding guide,
wherein the base is planar at least in a region of bearing of the seal, and
wherein the base has a reflective surface that is provided such that Raman excitation light incident through the measurement window is directionally reflected at the reflective surface so that the Raman signal of a particle is increased.

2. The liquid cell of claim 1, wherein the base comprises a metal or a metal alloy.

3. The liquid cell of claim 1, wherein the reflective surface of the base comprises a metal or a metal alloy.

4. The liquid cell of claim 1, wherein the reflective surface comprises a semi-transparent reflective layer arranged on the base.

5. The liquid cell of claim 1, wherein the base has an inlet opening and an outlet opening for filling, emptying, evacuating, or generating a throughflow in the measurement chamber.

6. The liquid cell of claim 1, wherein the reflective surface is continuously reflective in the wavelength range from about 300 nm to about 800 nm.

7. The liquid cell of claim 1, wherein the reflective surface is continuously reflective in the wavelength range from about 210 nm to about 1200 nm.

8. The liquid cell of claim 1, wherein the pressing element is configured to press-on the measurement window, the seal, and the base of the measurement chamber.

9. The liquid cell of claim 1, wherein the pressing element comprises a first region on or above the measurement window, and a second region on or above the base.

10. The liquid cell of claim 1, further comprising a spacer element that defines a predetermined spacing of the measurement window from the base.

11. The liquid cell of claim 1, wherein the microscope is a reflected light microscope.

12. The liquid cell of claim 1, wherein is configured for dark-field illumination of the particle suspension.

13. The liquid cell of claim 1, wherein the pressing element comprises a retaining ring.

14. The liquid cell of claim 1, wherein the pressing element comprises a pressing plate.

15. A system comprising:
a liquid cell, the liquid cell comprising a measurement chamber having a measurement window and a seal; and
a holding device comprising a sliding guide and a pressing element,
wherein the holding device is configured to close the liquid cell and fix the liquid cell in place when the liquid cell is pushed along the sliding guide.

16. The system of claim 15, wherein the pressing platcelement is configured to press the measurement window onto the seal when the liquid cell is placed in the holding device.

17. A microscope comprising:
a detector for the microscopic image capture and Raman spectroscopic measurements of a particle suspension; and
a liquid cell, wherein the liquid cell comprises a measurement chamber and a pressing element configured to couple with a sliding guide, the measurement chamber comprising a base, a measurement window located opposite the base, and a seal, wherein the base is planar at least in a region of bearing of the seal, and wherein the base has a reflective surface that is provided such that Raman excitation light incident through the measurement window is directionally reflected at the reflective surface so that the Raman signal of a particle is increased.

18. The microscope of claim 17, wherein the microscope is a reflected light microscope.

19. The microscope of claim 17, wherein the microscope is configured for dark-field illumination of the particle suspension.

* * * * *